United States Patent [19]

Rauchwerger

[11] 4,318,504
[45] * Mar. 9, 1982

[54] SUCTION TYPE DE-SOLDERING TOOL

[76] Inventor: George P. Rauchwerger, 147 Cromart Ct., Sunnyvale, Calif. 94086

[*] Notice: The portion of the term of this patent subsequent to Jun. 10, 1997, has been disclaimed.

[21] Appl. No.: 86,651

[22] Filed: Oct. 22, 1979

Related U.S. Application Data

[63] Continuation-in-part of Ser. No. 809,090, Jun. 23, 1977, Pat. No. 4,206,864.

[51] Int. Cl.³ .............................................. B23K 3/00
[52] U.S. Cl. ...................................................... 228/20
[58] Field of Search ......................... 228/20; 219/230; 15/341, 344; 417/511

[56] References Cited

U.S. PATENT DOCUMENTS

| | | | |
|---|---|---|---|
| 1,379,492 | 5/1921 | Wagner | 417/511 |
| 2,960,591 | 11/1960 | Brillinger | 228/20 |
| 3,024,343 | 3/1962 | Siwakowski | 219/230 X |
| 3,171,374 | 3/1965 | Frenzel | 219/230 X |
| 3,224,378 | 12/1965 | Graham | 417/511 |
| 3,245,598 | 4/1966 | Kopernak | 228/20 |
| 3,443,733 | 5/1969 | Parente | 219/230 X |
| 3,842,240 | 10/1974 | Wakita et al. | 228/20 X |
| 4,193,160 | 3/1980 | Vandermark | 228/20 X |
| 4,206,864 | 6/1980 | Rauchwerger | 228/20 |

*Primary Examiner*—Gil Widenfeld
*Assistant Examiner*—K. J. Ramsey
*Attorney, Agent, or Firm*—Julian Caplan

[57] ABSTRACT

A hand-held, trigger-actuated tool heats solder to be removed from a workpiece and draws the melted solder into the distal tip of the tool by vacuum. From the tip, the molten solder is drawn into a relatively large diameter, thin-walled, extended tube in which the solder hardens into pellets which may be removed as required by removing a plug in a chamber at the near end of the tube. A solenoid in the handle of the tool operates a plunger in a cylinder which communicates with the top of the chamber through a duct. The plunger has a one-way valve in its head which has a sealing disk which "floats" in the head, and on the return stroke of the plunger permits air trapped in the cylinder head to escape.

7 Claims, 3 Drawing Figures

U.S. Patent     Mar. 9, 1982     4,318,504
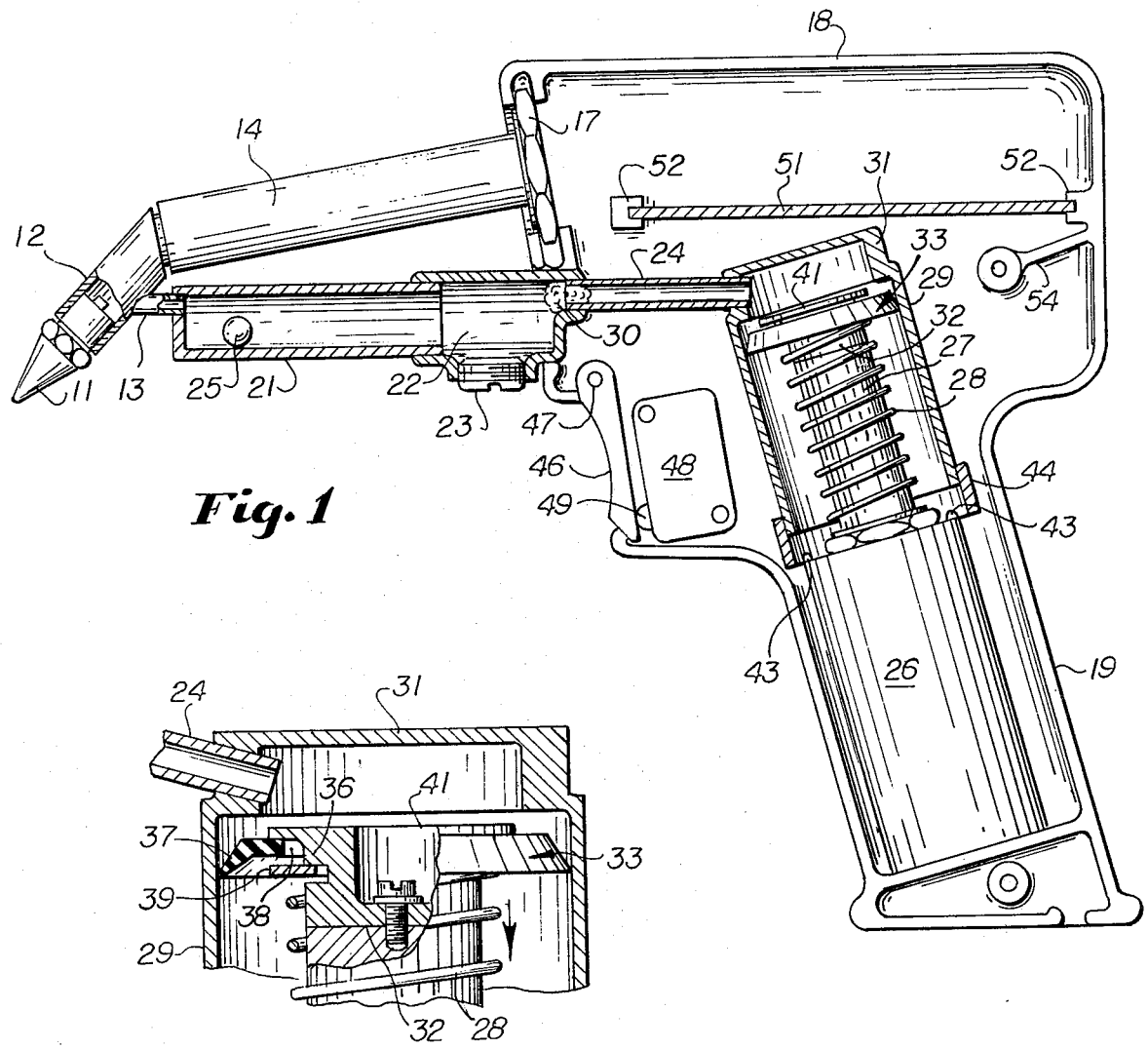
Fig. 1
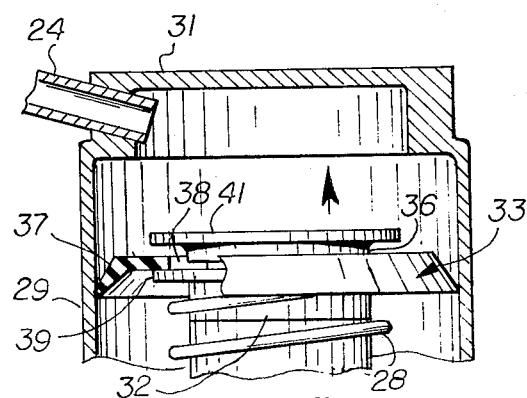
Fig. 2
Fig. 3

SUCTION TYPE DE-SOLDERING TOOL

This application is a continuation-in-part of my co-pending Application Ser. No. 809,090, filed June 23, 1977, now U.S. Pat. No. 4,206,864, issued June 10, 1980.

More particularly, this application relates to a suction type desoldering tool.

Prior desoldering tools range from plunger types to sophisticated vacuum operated stations. Among these is a combination soldering iron with a hollow tip, a tube and a rubber bulb to provide desoldering with a one-hand operation. Such a tool is inefficient since it must be cocked, put into position, a regular soldering iron used to melt the solder and then the tool is released. It is bulky and generally requires two hands to operate, thereby requiring that the work be fastened down. The sophisticated desoldering stations are expensive, not portable and require a source of compressed air which is expensive and has maintenance problems. A hollow tip soldering iron with a rubber bulb is awkward to use since the bulb must be squeezed and released while holding in the hand; and further, the rubber bulb does not have sufficient capacity to remove the solder entirely with the result that work is sloppy and the tip tends to become clogged.

Accordingly, a principal object of the present invention is to overcome the above-mentioned deficiencies of pre-existing desoldering tools by providing a fast, lightweight unit which can be used with one hand and can be produced at reasonable cost.

Another object of the invention is to provide a tool which is comfortably held in the hand and does not require such physical effort by the operator as to cause fatigue. In the present invention, the operator places the hot tip of the gun on the soldered joint, pulls a trigger with one finger and the gun performs the vacuum operation.

A further feature of the invention is the fact that the gun is lightweight, can be plugged into any electrical socket and can be used in any location either on a bench or in the field.

The tip is heated by an element similar to those used in soldering irons and reaches working temperature in approximately sixty seconds. This eliminates the necessity of leaving the tool plugged in for long periods of time and conserves energy.

Because of the simplicity of construction, the tool can be mass produced at a low cost and maintenance costs are also extremely low.

One of the unique features of the present invention is the fact that a solenoid actuated plunger is provided reciprocating in a cylinder. The piston of the plunger "floats" between a permanent stop on its underside and a shoulder on its upper side. The piston is formed with a hole. On the down stroke of the plunger the shoulder fits against the piston and closes the hole, permitting the piston to draw a vacuum. However, on the up stroke, the piston moves away from the shoulder into contact with a perforate retainer ring, and this prevents air from being trapped in the head of the cylinder. Thus, a very simple valve is incorporated in the head of the piston to insure that a vacuum is drawn through the system on the downward stroke of the piston and air is not pushed through the tip on the return stroke.

Other objects of the present invention will become apparent upon reading the following specification and referring to the accompanying drawings in which similar characters of reference represent corresponding parts in each of the several views.

In the drawings:

FIG. 1 is a plan view of the device almost entirely broken away in section to reveal internal construction.

FIG. 2 is an enlarged fragmentary sectional view of the cylinder head and piston on the down or suction stroke showing the aforementioned hole closed.

FIG. 3 is a view similar to FIG. 2 on the return stroke showing the hole open.

The present invention is used on the bench or in the field to remove solder from a joint, such as on a printed circuit board. The device is hand-held, and for convenience, is generally similar to the shape of a pistol. At the distal end of the tool is a hollow conical tip 11 disposed generally at about a 45° angle to the normal holding position of the tool, an angle which is most convenient for removing solder from the work which may either be flat on the bench or tilted 45° from the horizontal. Tip 11 is threaded into tip holder 12, and leading from the tip holder 12 is suction tube 13 which is of a small diameter, short, and preferably of a material such as stainless steel so that the molten solder therein does not clog the tube. The upper end of tip holder 12 is fixed to heater element 14. The proximal end of the heater 14 is fitted into the forward end of the tool casing 18 by means of a connector nut 17 or other convenient means. The casing 18 is hollow and generally of a pistol shape having a conveniently shaped handle 19.

Immediately inward of the suction tube 13 is a large diameter, thin-walled cooling tube 21, and interposed between the tube 21 and the casing 18 is a connecting manifold 22 closed with a cap 23, which may be held therein by threads or friction. It will be understood solder sucked through the tube 13 cools to form pellets in the tube 21 and that these collect in tube 21 and manifold 22 and can be removed when plug 23 is unthreaded or otherwise removed. A free rolling ball 25 rolls freely in tube 21 to pulverize solder when the operator shakes the tool.

Communicating with the upper end of manifold 22 is a duct 24 through which a vacuum is drawn from the tip 11, suction tube 13, cooling tube 21 and manifold 22, all as has been hereinafter explained. A filter 30 may be inserted into the entrance to duct 24 to prevent solder from being sucked out of manifold 22. Ball 25 diverts solder to prevent filter 30 from clogging too fast. Filter 30 may be changed when required.

Preferably, located in the handle 19 at casing 18 is a solenoid 26. Such a location is particularly desirable since this is the heaviest element of the tool and the distribution of weight in the handle is desirable for comfort in handling. Solenoid 26 has the conventional plunger 27 which is biased away from the solenoid 26 by return spring 28. Surrounding the plunger 27 and extending outwardly beyond the solenoid 26 is a smooth bore cylinder 29 having a head 31 at its upper end. Fixed to the plunger 27 is a piston holder 32, and it will be observed that the spring 28 preferably surrounds the holder 32. On the outer end of holder 32 is a floating piston 33 formed of neoprene or other suitable resilient material.

The piston 33 is preferably of a specific shape having a conical downwardly-outwardly disposed peripheral flange 37 which seals against the inside of the cylinder 29. Piston 33, and piston holder 32 form a "floating valve", piston 33 floating in the space between shoulder 41 and retainer ring 39. Piston support 36 (part of 32) is smaller in diameter than hole or opening 38 of the piston, thus allowing for air to pass through it in the return cycle. Retainer ring 39 is fixed to the holder 32 and limits downward movement of the piston 33 relative to the holder 32, as shown in the accompanying drawings. Upon the side of the disk 36 opposite ring 39 is a shoulder 41 fixed to the holder 32. Vents 43 are formed in the bottom 44 of cylinder 29.

On the front of the handle 19 and extending through an aperture therein is a trigger 46 pivoted at its upper end by pivot 47 to the casing 18. Immediately inside the trigger 46 is a snap action switch 48 which has a switch plunger 49 which may be contacted by the trigger 46 when it is squeezed inwardly, thereby closing the switch 48. The electrical wiring of the tool includes a printed circuit board 51 received in the upper end of housing 18. Preferably a heat deflector 54 is formed on the inside of the casing 18 to deflect heat from the handle 19.

In the use of the tool, the tip 11 is brought into proximity to the work where there is a surplus of solder which is to be removed. Tip 11 melts the solder it contacts; after a sufficient time interval for melting the solder, the user presses the trigger 46, closing switch 48. This causes the solenoid 26 to be actuated thru a timing circuit which allows it to remain energized for only about one second thus preventing overheating. To reenergize the solenoid, the trigger must be released, thus resetting the timing circuit, and then pressed again for the next cycle. Actuation of the solenoid 26 causes the piston 33 to move downward. Commencement of this movement is shown in FIG. 2. It will be seen that the resistance to downward movement of the floating piston 33 by reason of the friction of the flange 37 against the cylinder wall 29 causes an upward movement of piston 33 relative to the holder 32, and this forces piston 33 into engagement with the shoulder 41, effectively closing the hole or holes 38. Hence, as the piston 33 is moved downward by the solenoid 26, a vacuum is drawn through the duct 24 and, accordingly, through the tip 11. This causes solder to be sucked into the tip 11 and then through the tube 13 in molten state. Tube 13 is small and close to the tip holder 12, and hence the solder does not tend to solidify therein. However, when it reaches the cooling tube 21, heat is rapidly dissipated by reason of the large diameter of the tube 21 and its extended length. Hence the solder forms into pellets. As has been stated, from time to time the pellets accumulate, then they may be removed by removing plug 23. Normal use of the tool causes ball 25 to roll in the tube 21 to break up pellets.

After the solenoid 26 has fully retracted its plunger 27, the solenoid 26 is de-energized and the spring 28 returns the plunger 27 and holder 32 to upward position inasmuch as the spring 28 bears against the retainer ring 39. The position of the parts near the end of the upward movement of the piston is shown in FIG. 3. It will be seen that the friction of the piston 33 against the walls of the cylinder 29 brings piston 33 to bear against the perforate retainer ring 39 and away from the shoulder 41. This permits air which is trapped in the system to escape through the hole 38 below the piston 33 and out through the vents 43.

The sequence of operations heretofore described is repeated each time that the operator squeezes the trigger 46.

What is claimed is:

1. A desoldering tool comprising a casing formed with a handle, a hollow tip, support means on said casing supporting said tip, a suction tube connected to and communicating with said tip, means near said tip for heating said tip discrete from said suction tube, a cooling tube, said cooling tube being supported by said casing, said suction tube opening into the upper portion of the distal of said cooling tube, said cooling tube being of substantially greater cross-section than said suction tube and being thinwalled and of extended length so that molten solder sucked through said suction tube hardens into pellets in said cooling tube, means connected to said cooling tube having a removable cap to discharge solder pellets from said means, a cylinder in said handle having a head, said cooling tube extending transversely to said cylinder and said handle, a duct from the top of said cooling tube leading into said head, a piston reciprocable in said cylinder for drawing a vacuum through said duct, said cooling tube, said suction tube and said tip, said tip, suction tube, cooling tube, duct and head being in continuous communication with each other, actuating means to reciprocate said piston and manual means to actuate said actuating means.

2. A tool according to claim 1 which further comprises a check valve in said piston to restrict air from flowing out of said head.

3. A tool according to claim 1 which further comprises a piston holder connected to said actuating means, a shoulder on the end of said piston holder nearest said head, a groove in said piston holder spaced below said shoulder, a retainer ring in said groove with a gap longitudinal of said piston holder between said shoulder and said retainer ring, said piston comprising an annular disk having an opening smaller than said shoulder and smaller than said retainer ring and a flange engaging said cylinder, said disk being moveable along said gap relative to said piston holder, said shoulder contacting said disk on the inward stroke of said piston to close said opening.

4. A tool according to claim 3 in which said actuating means comprises a solenoid having a plunger connected to said piston holder and a spring biasing said piston, said piston holder and said plunger toward said head and away from said solenoid.

5. A tool according to claim 1 in which said solenoid is in said handle and further comprises a switch having a switch plunger in said handle and in which said manual means comprises a trigger and pivot mounting said trigger in said handle at a position corresponding to the position of a pistol trigger, whereby pulling said trigger depresses said plunger and closes said switch, said switch energizing said solenoid.

6. A tool according to claim 1 which further comprises a ball free to roll in said cooling tube to break up pellets in said cooling tube.

7. A tool according to claim 6 which further comprises a removable filter in said cooling tube at the entrance to said duct, said ball at one end of its rolling movement in said cooling tube contacting said filter to reduce clogging of said filter.

* * * * *